US006892585B2

(12) United States Patent
Clarke

(10) Patent No.: US 6,892,585 B2
(45) Date of Patent: May 17, 2005

(54) VARIABLE AMPLIFICATION BOLT LOAD INDICATOR APPARATUS AND A METHOD OF MAKING AND USING THE APPARATUS

(76) Inventor: Ronald C. Clarke, 328 W. Georgia Ave., Phoenix, AZ (US) 85009

( * ) Notice: Subject to any disclaimer, the term of this patent is extended or adjusted under 35 U.S.C. 154(b) by 102 days.

(21) Appl. No.: 10/239,447

(22) PCT Filed: Mar. 22, 2001

(86) PCT No.: PCT/US01/09056

§ 371 (c)(1),
(2), (4) Date: Sep. 20, 2002

(87) PCT Pub. No.: WO01/71202

PCT Pub. Date: Sep. 27, 2001

(65) Prior Publication Data

US 2003/0051556 A1 Mar. 20, 2003

Related U.S. Application Data

(60) Provisional application No. 60/191,217, filed on Mar. 22, 2000.

(51) Int. Cl.[7] .............................................. F16B 31/02
(52) U.S. Cl. ............................. 73/761; 73/760; 411/8; 411/14; 411/402
(58) Field of Search ......................... 73/760, 761, 299; 411/8–14, 402; 33/829–833

(56) References Cited

U.S. PATENT DOCUMENTS 3,693,738 A * 9/1972 Andrews ..................... 73/299

| 4,879,819 | A | * | 11/1989 | Johnston et al. | 33/833 |
|---|---|---|---|---|---|
| 4,989,331 | A | * | 2/1991 | Dodge | 33/829 |
| 5,222,849 | A | * | 6/1993 | Walton | 411/14 |
| 5,584,627 | A | * | 12/1996 | Ceney et al. | 73/761 |
| 5,885,040 | A | * | 3/1999 | Parker | 411/14 |
| 6,055,737 | A | * | 5/2000 | Sweaney | 33/534 |

FOREIGN PATENT DOCUMENTS

JP 06288847 A * 10/1994 ............. G01L/5/00

* cited by examiner

*Primary Examiner*—Max Noori
*Assistant Examiner*—Alandra Ellington
(74) *Attorney, Agent, or Firm*—Parsons & Goltry; Michael W. Goltry; Robert A. Parsons

(57) ABSTRACT

A variably amplified load indicating fastener includes a fastener (100) detachably secured to a load indicator via a base member. The fastener (100) has an abutment which is moved by a change in length under an applied load. The load indicator includes a dial plate (16), a needle (24) pivotally supported by the plate (16), a compensating slot (36), a driving slot, an elongated U-shaped element (50) disposed in the direction in which the load is applied when the fastener (100) is in use, and a first reference mark (40*a*). One side of the U is rigidly attached to the fastener. The closed end of the U is proximate to and movable by the abutment. The other side of the U extends through the compensating slot (36) and the driving slot (26). The needle (24) is operatively coupled to the outer end of said second side. A sleeve with a second reference mark fits over the outer circumference of both the load indicator and the base member.

18 Claims, 18 Drawing Sheets

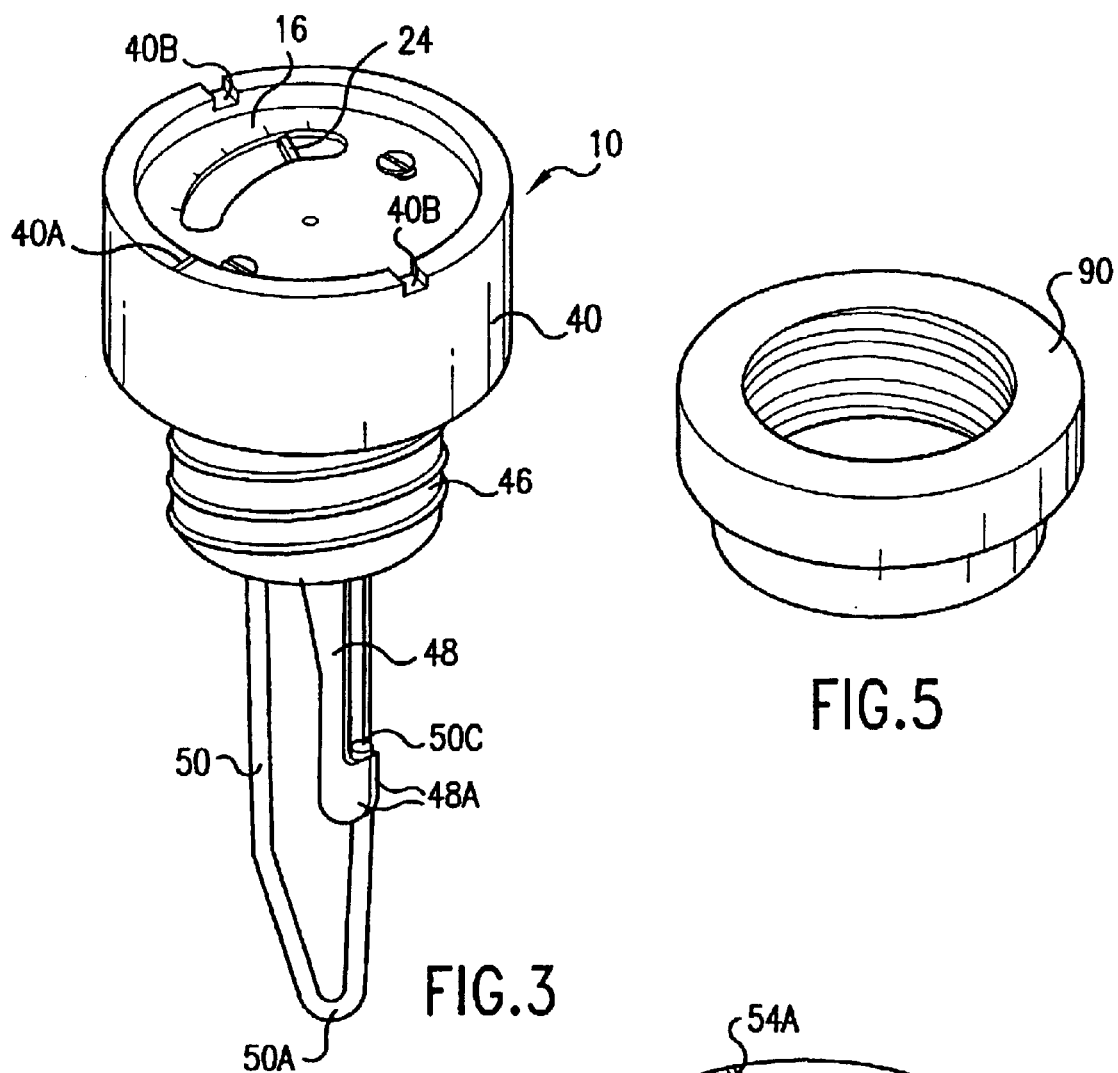
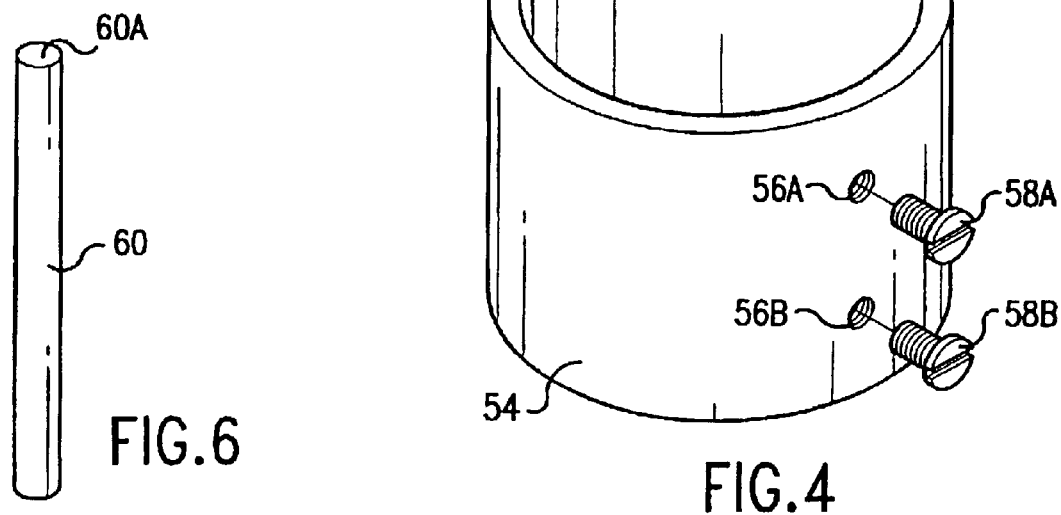

LOAD INDICATOR APPARATUS ASSEMBLY PROCESS

START

↓

SECURE SPRING WIRE 50 TO SPRING WIRE SUPPORT MEMBER 48 BY CRIMPING SECURING TABS 48A AROUND ATTACHMENT END 50C OF SPRING WIRE 50.

↓

SECURE SUPPORT MEMBER 48 TO MAIN BODY 40 BY INSERTING DRIVING END 50B OF SPRING WIRE 50 INTO AND THROUGH ACCESS HOLE 42 AND THEN SECURE SUPPORT MEMBER 48 TO MAIN BODY 40 USING SCREWS 52.

↓

POSITION COMPENSATING PLATE 34 INTO UPPER CAVITY OF MAIN BODY 40 SUCH THAT THE DRIVING END 50B OF SPRING WIRE 50 EXTENDS THROUGH COMPENSATING SLOT 36 AND MOUNTING HOLES 38 ARE IN ALIGNMENT WITH THREADED HOLES 44.

↓

POSITION SPACER PLATE 30 ONTO COMPENSATING PLATE 34 SUCH THAT MOUNTING HOLES 32 ARE IN ALIGNMENT WITH HOLES 38 AND 44.

↓

PIVOTABLY COUPLE INDICATOR NEEDLE 24 TO UNDERSIDE OF DIAL PLATE 16 USING PIVOT PIN 29.

↓

POSITION DIAL PLATE 16 AND INDICATOR NEEDLE 24 PIVOTABLY COUPLED THERETO ONTO SPACER PLATE 30 SUCH THAT DRIVING END 50B OF SPRING WIRE 50 EXTENDS THROUGH DRIVING SLOT 26 OF NEEDLE 24 AND THAT ADJUSTMENT SLOTS 18 ARE IN ALIGNMENT WITH HOLES 32, 38 AND 44.

↓

COUPLE ABOVE COMPONENTS TO MAIN BODY 40 BY INSERTING SCREWS 14 THROUGH SLOTS 18, AND HOLES 32 AND 38 AND INTO THREADED HOLES 44.

↓

PRESS FIT LENS 12 INTO UPPER CAVITY OF MAIN BODY 40 AFTER CALIBRATION IS COMPLETE.

↓

END

FIG. 16

| DIAL/NEEDLE POSITION | TOP | MIDDLE | BOTTOM |
|---|---|---|---|
| ANGULAR ROTATION OF NEEDLE FOR 0.125 WIRE MOVEMENT | 74.6° | 64.0° | 55.5° |

VARIABLE AMPLIFICATION BOLT LOAD INDICATOR APPARATUS AND A METHOD OF MAKING AND USING THE APPARATUS

PRIORITY

The present application claims priority to provisional application No. 60/191,217 filed on Mar. 22, 2000.

BACKGROUND

The present invention relates generally to devices and methods of measuring and indicating applied bolt loads, and, more particularly, to a mechanically actuated bolt load indicator having variable, adjustable indicator amplification which provides easy calibration independent of a fastener and more accurate bolt load measurement and indication thereof.

Mechanical bolt load indicating devices are used where it is necessary to continuously monitor the tensile strain that a bolt or other fastener is subjected to while in use. Such load indicating apparatuses are typically installed into a recessed portion of a bolt head such that a mechanical load indicator element is caused to move relative to the amount the bolt stretches or elongates as a load is applied thereto. A dial plate having a reference scale is used to indicate to the user the amount of load to which the bolt is being subjected when it is initially tightened and thereafter as the load changes over time.

Prior art examples of mechanical bolt load indicating apparatuses include Maxbolt™ and Betabolt™ load-indicators. The structure and operation of the Maxbolt™ and Betabolt™ load indicators are described in detail, respectively, in U.S. Pat. Nos. 5,668,323 and 5,584,627 the disclosures of which are incorporated herein by reference in their entirety.

FIGS. 1 and 2 show a prior art mechanically actuated bolt load indicator and fastener 70 composed of a body 72 having a shank 74 and an abutment 60A formed at the end of a gauge pin 60, which is moved by the changing length of the body 72 under an applied load, and a load sensing member 11. The body is drilled with a blind bore 76. The fastener may be used, for example, as shown to fasten two flat members 80 together using the nut 78. The load sensing member 11 is composed of an element 51 disposed in the direction in which the load is applied when the fastener is in use. The element 51 is of elongated U-shape, a first limb 51 C of the U rigidly attached to the body 72, a closed end 51 A of the U bearing on the abutment 60A so as to move with the abutment 60A, and a second limb 51 B of the U having registering the applied load 5 on a scale 17 (FIG. 2). FIG. 18 describes a process of making this fastener.

Indicator needles in conventional mechanical load indicators, such as that of FIGS. 1 and 2, provide a fixed and limited amount of amplified movement relative to the amount that the bolt stretches when subjected to a load. Therefore, the sweep distance of the indicator needle from a zero reference to a maximum reference is relatively small thereby decreasing the overall precision with which the device can be read because the dial plate is relatively small with few well defined bolt load references. For example, a typical bolt load that causes a 0.004" elongation of a bolt produces a mere 0.125" total sweep distance of the indicator needle from a zero reference to a maximum reference.

Another problem that exists with conventional bolt load indicators is that their relatively small dial plates may be difficult to see and read correctly due to the parallax effect. Adverse environmental conditions such as poor lighting, moisture, debris or the location of the bolt in which the load indicator is installed may make it even more difficult to read the indicator correctly.

A still further problem with conventional bolt load indicators is that conventional indicator needles travel or move in a generally linear direction across the dial plate. Therefore, the maximum needle moment amplification that is obtainable is limited to the diameter of the dial plate which in turn is limited by the size of the bolt head itself A still further problem that exists with conventional bolt load indicators is that they can not be universally calibrated during the assembly process.

SUMMARY

Accordingly, embodiments of the present invention provide a mechanical bolt load indicator apparatus and method having a radially adjustable and dynamically variable moment arm that amplifies the indicator needle's non-linear circumferencial travel. The present invention also provides a dial plate with greater surface area to increase overall precision. The mechanical bolt load indicator apparatus is simply calibrated and set in the factory during manufacture and may be used universally with any fastener in the field adapted to receive such a load indicator, including small diameter bolts with small bolt heads. The load indicator may be made from a material having the same coefficient of thermal expansion as the fastener.

One aspect of the invention is a variable, adjustable amplification load indicator for fasteners. This embodiment includes a main body having a central bore and a U-shaped spring wire having an attachment end secured to the main body, a pivot point, and a drive end extending through the central bore of the main body. The spring wire pivot point is mechanically responsive to the extension of the fastener bolt in proportion to the amount of load applied to the fastener bolt to cause correlative movement of the drive end of the spring wire. This embodiment also includes a plate having a compensating slot, and a needle pivotally mounted to a dial plate and having a drive slot. The drive end of the spring wire extends through the compensating slot and the drive slot in order to angularly drive the needle about its pivot pin. The distance between the pivot pin and the spring wire drive end is adjustable to amplify the needle movement for a given fastener extension and spring wire drive end movement.

In this aspect of the invention the adjustable distance is effected by the movement of the dial plate carrying the needle pivot pin. The distance between the pivot pin and the spring wire drive end may be increased to reduce the amount of angular needle rotation for a given fastener extension. The distance between the pivot pin and the spring wire drive end is shortened to increase the amount of angular needle rotation for a given fastener extension.

Another embodiment of this invention includes a base member having a central bore mounted in a recessed opening in the fastener, the main body of the load indicator removably secured in the base member, and a reference sleeve surrounding the base member and main body. The reference sleeve and main body have alignable reference marks, one fixed relative to the base member, the other fixed relative to the main body. In this way the main body may be removed from a fastener under load and re-installed or replaced and be repositioned at its position at the time of removal and continue to indicate the correct applied load without further calibration.

The advantages of the present invention include:
1. Greater needle movement for the same amount of spring wire movement enables a mechanically actuated load indicator to fit into small diameter fastener bolts.
2. Increased accuracy in indicating applied loads.
3. Simplicity of calibration.
4. Factory calibration during manufacture that fits any unit in the field.
5. Removable in the field from a fastener under load for maintenance, repair, or replacement, and reinstallable to continue indicating applied load accurately without further calibration.
6. Easily readable and visible.

BRIEF DESCRIPTION OF THE DRAWINGS

FIG. 3 is a perspective view of the mechanically actuated bolt load indicator assembly of the present invention.

FIG. 4 is a perspective view of the reference sleeve 54 of the present invention.

FIG. 5 is a perspective view of the base member 90 of the present invention.

FIG. 6 is a perspective view of the gauge pin 60 of the present invention.

FIG. 16 is a flow chart of the process of assembling the mechanical load indicator apparatus of FIGS. 3–17 of the present invention.

DETAILED DESCRIPTION a. Method of Making the Fastener Bolt

Figure 17:
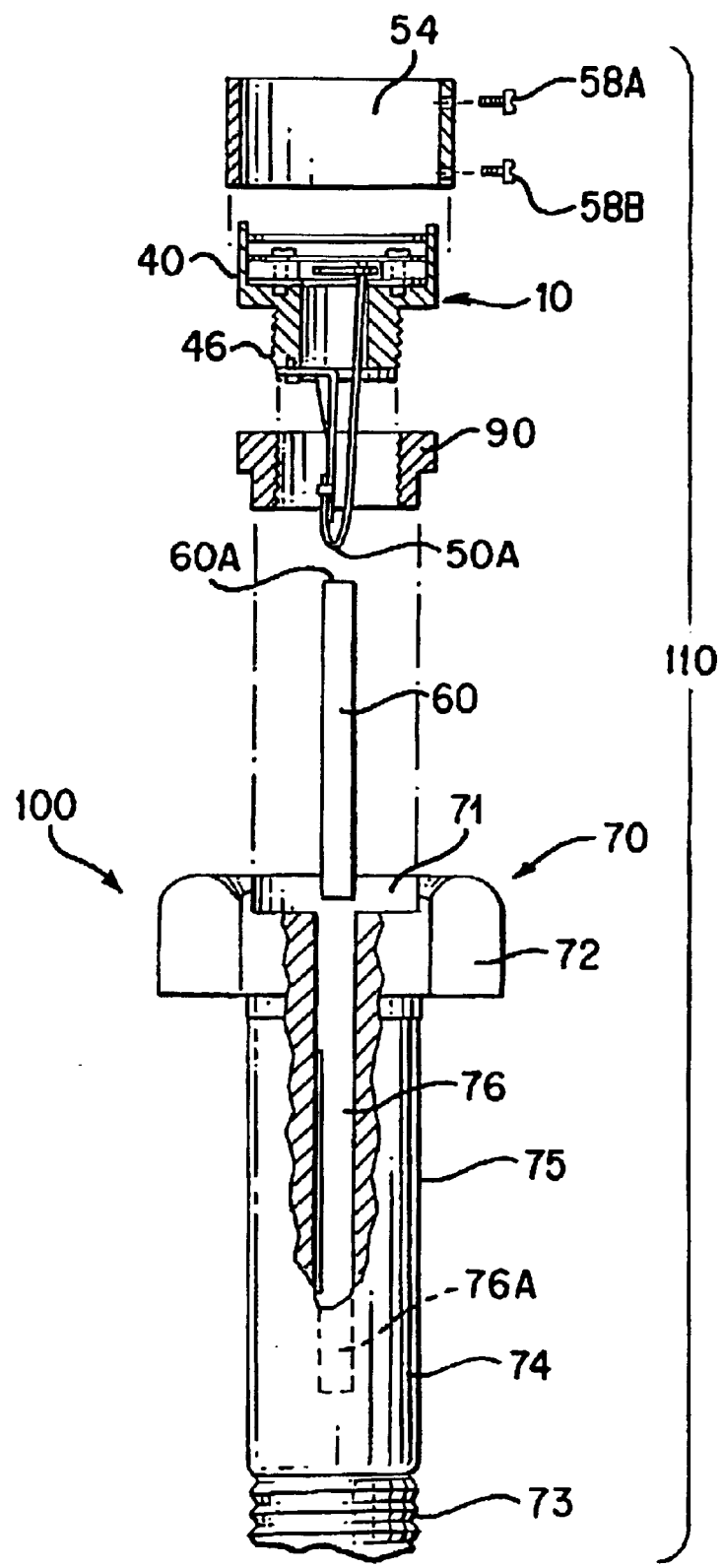
FIG. 17 is a partially exploded front elevational view in partial section of the improved Betabolt™ mechanical load indicator apparatus of FIGS. 3–17 installed in a fastener including a pre-drilled fastener head 72 and fastener shank 74 of the type seen in FIG. 1.
Figure 18:
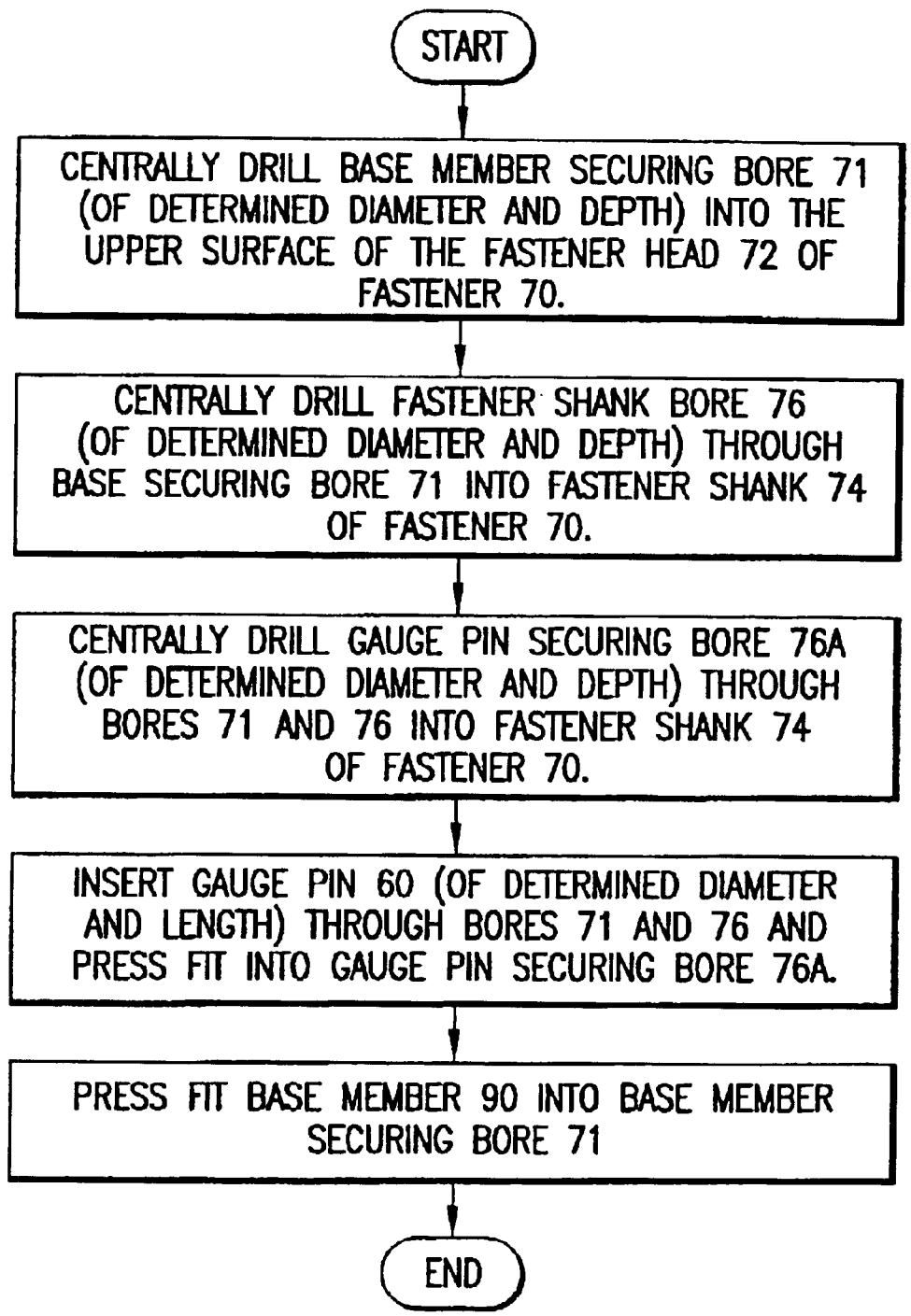
FIG. 18 is a flow chart of the prior art process of making a bolt for use with a load indicator apparatus of the present invention.

As shown in FIG. 17 the load indicating fastener assembly 110 of the present invention includes a fastener 100. The fastener 100 includes a bolt 70 having a forged metal, for example steel, body which includes a hexagonal head 72 and a shank 74 which has an externally screw-threaded portion 73 spaced from the head 72 by a plain cylindrical portion 75. Drilled into the head 72 and shank 74 coaxially with its rotational axis, is a blind bore 76 of predetermined diameter and depth for receiving a clearance gauge pin 60. The blind bore 76 extends from the top of the head 72, through the head 72 and into the shank 74 for approximately half the length of the plain cylindrical portion 75. The outer end of the bore 76 is counter bored to a predetermined diameter and depth to form an enlarged recessed opening 71 which is threaded to receive a base member 90 which is adapted to receive a load indicator assembly 10 of the present invention. Blind bore 76 is further drilled to a smaller predetermined diameter and depth to provide a bore 76A for receiving by press fit therein gauge pin 60. Base member 90 is press fit into counter bore 71 in the fastener head 72 and has a threaded bore for receiving therein securing threads 46 of the main body 40 of the load indicator assembly 10 of the present invention, as more fully described below. The main body 40 may be made out of metal or a non-metal.

Figure 1:
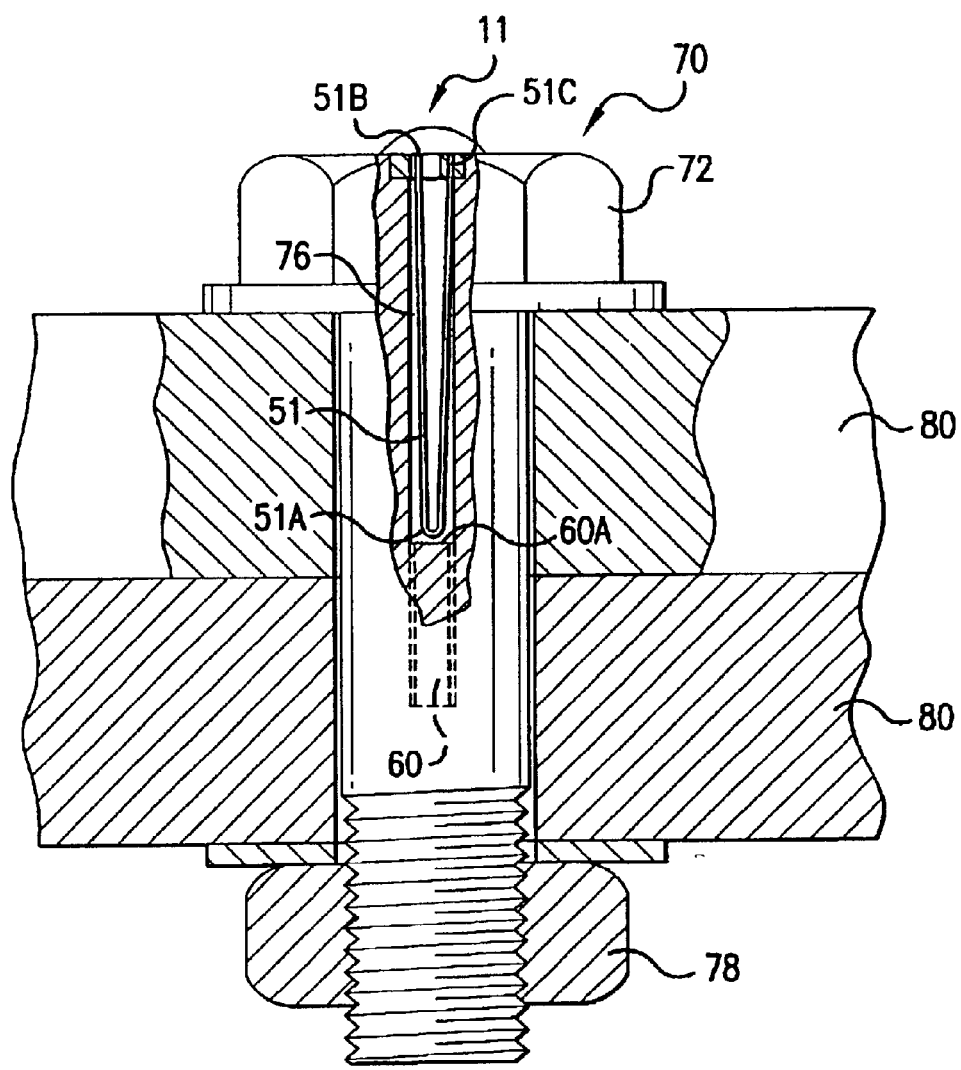
FIG. 1 is a side elevation view in partial section of a prior art mechanically actuated bolt load indicator and fastener.
Figure 2:
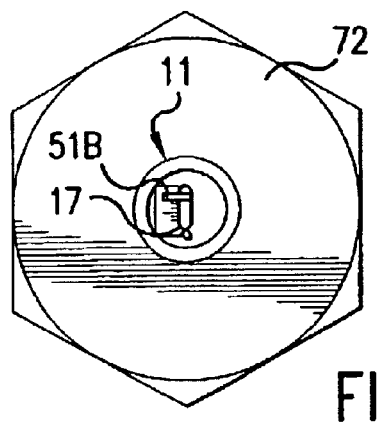
FIG. 2 is a top plan view of FIG. 1.
Figure 7:
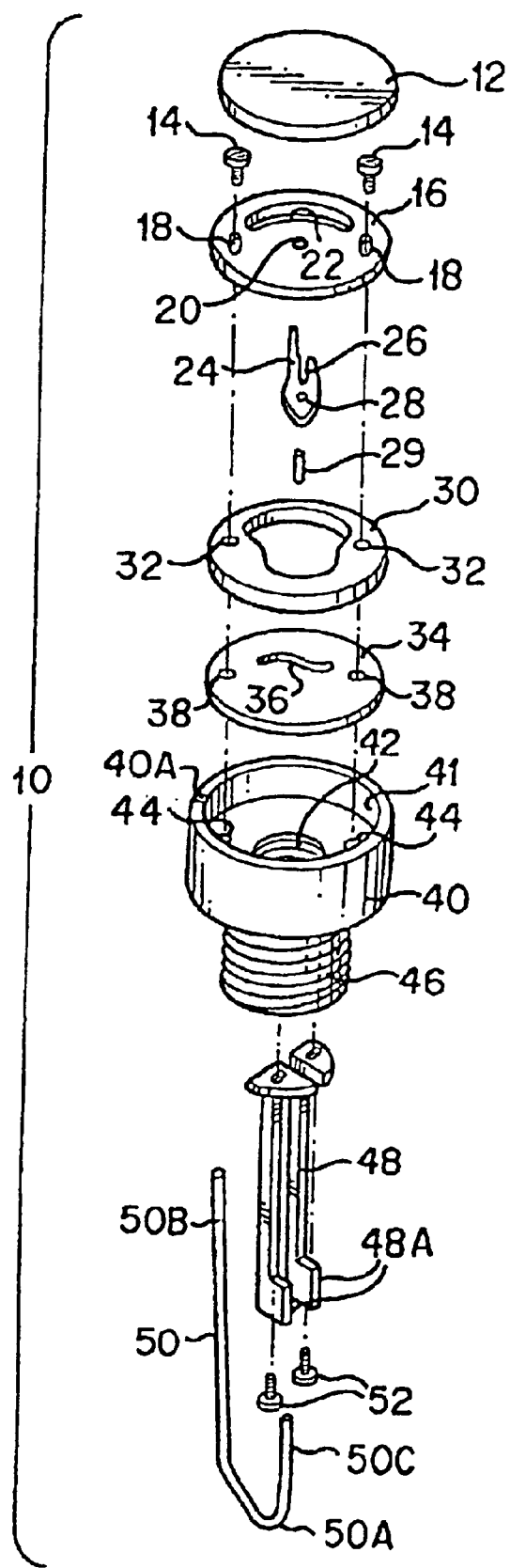
FIG. 7 is an exploded perspective view of the mechanically actuated bolt load indicator assembly of the present invention.
Figure 8:
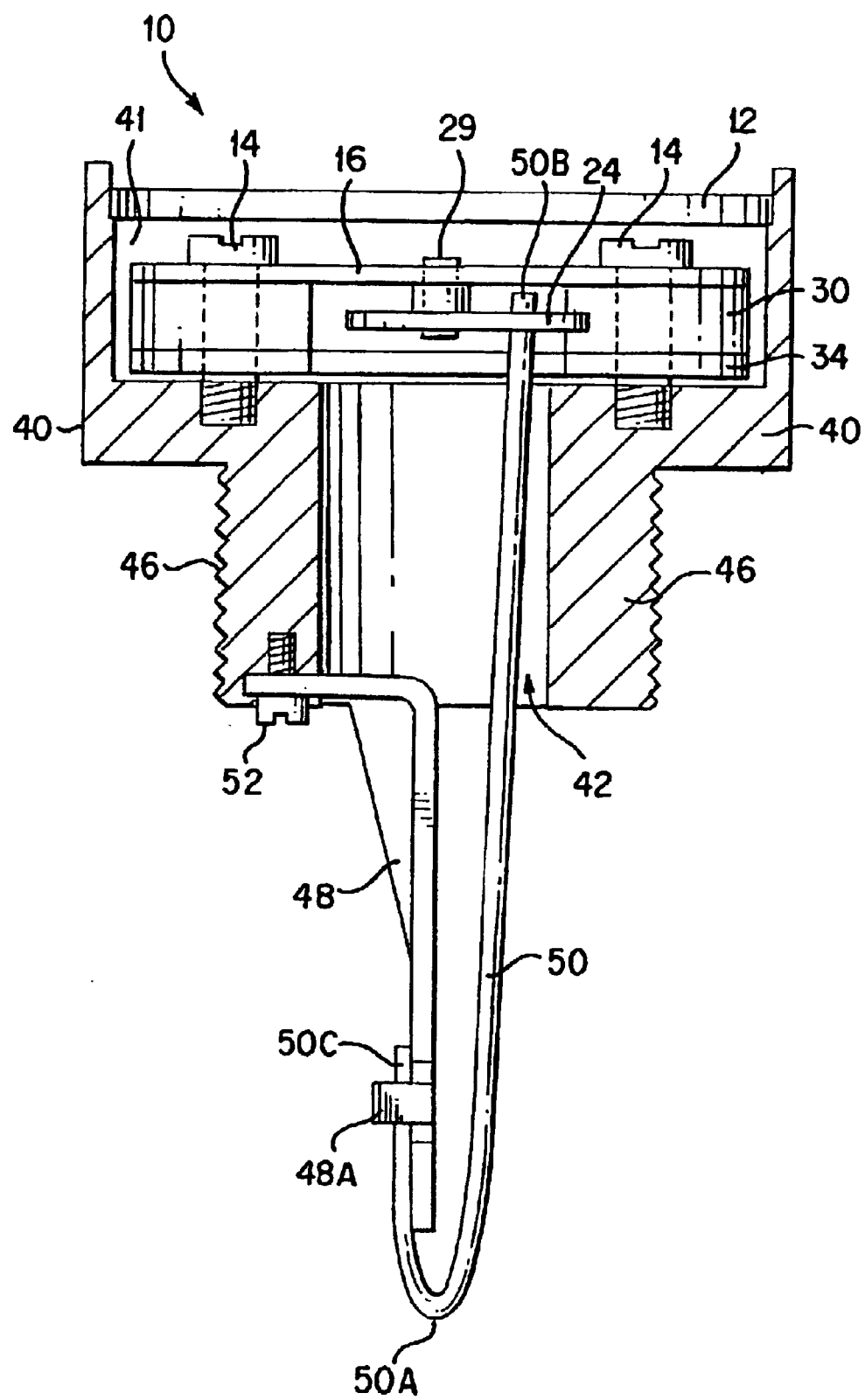
FIG. 8 is a front elevation view in partial section of FIG. 3.
Figure 9:
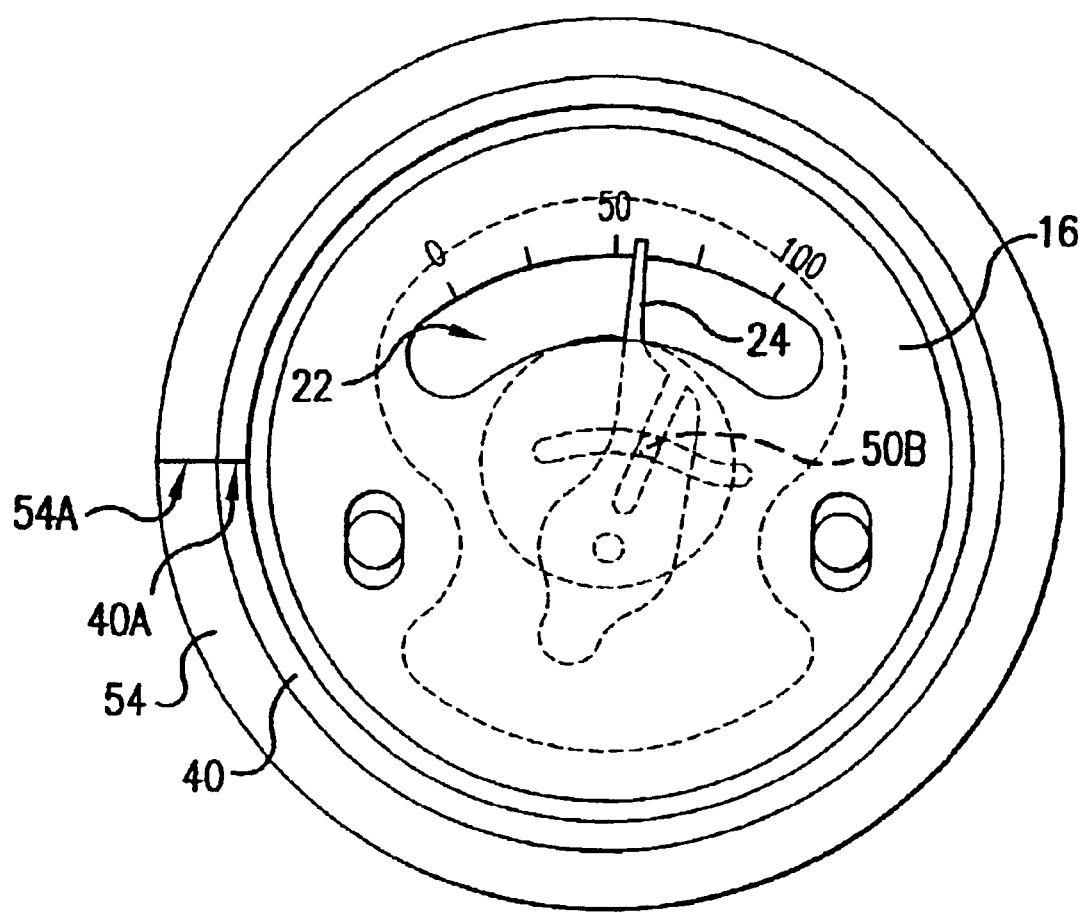
FIG. 9 is an enlarged top plan view of FIG. 3.
Figure 10:
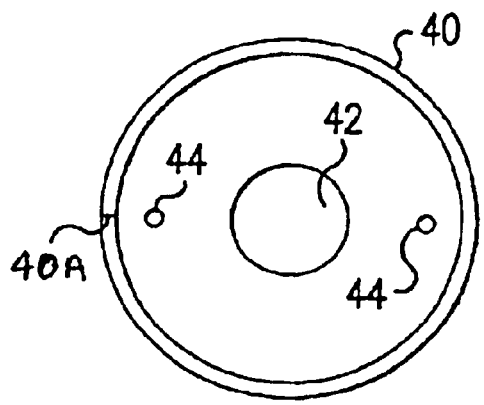
FIG. 10 is a top plan view of the main body 40 of FIG. 9.
Figure 11:
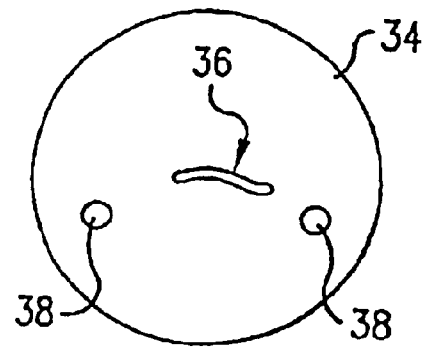
FIG. 11 is a top plan view of the compensating plate 34 of FIG. 9.
Figure 12:
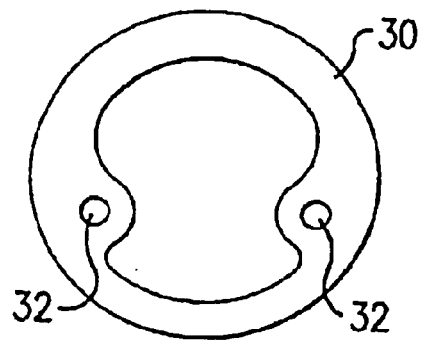
FIG. 12 is a top plan view of the spacer plate 30 of FIG. 9.
Figure 13:
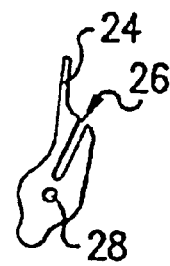
FIG. 13 is a top plan view of the indicator needle 24 of FIG. 9.
Figure 14:
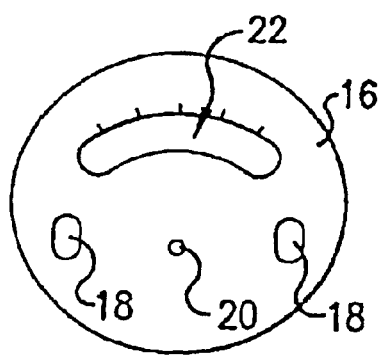
FIG. 14 is a top plan view of the dial plate 16 of FIG. 9.
Figure 15:
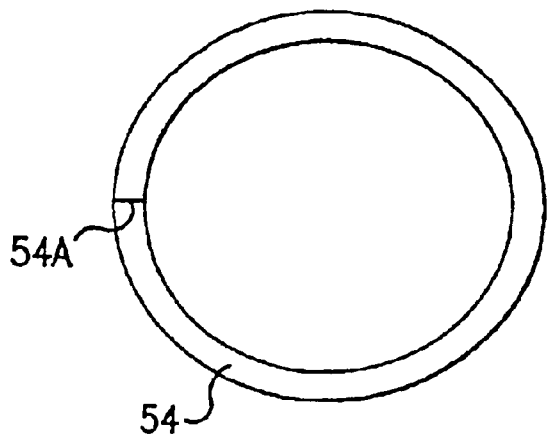
FIG. 15 is a top plan view of FIG. 4.

A reference sleeve 54 slips over the outer circumference of both base member 90 and main body 40 and is secured in position resting atop the fastener head 72 by a screw 58A which contacts main body 40 and by a screw 58B which contacts base member 90, as more fully described below. Reference sleeve 54 carries a reference mark 54A (FIG. 4) on its outer top rim as more fully described below.

b. The Process of Assembling the Variable Amplification Load Indicator Apparatus As seen in FIGS. 3–15 and described in FIG. 16, the variable amplification bolt load indicator of the present invention has the following features and is assembled according to the following process:

A spring wire 50 is secured to a spring wire support member 48 by crimping tabs 48A or other suitable securing means around attachment end 50C of spring wire 50. Support member 48 is then secured to the bottom end of main body 40 by inserting the driving end 50B of spring wire 50 into and through the central bore 42 of main body 40 and then securing support member 48 to main body 40 using screws 52 or other suitable securing means. (FIG. 8). If main body 40 and support member 48 are both metal, they may also be secured together, for example by spot welding, crimping or the like. Components may also be made out of plastic or other material to suit the environment.

A compensating plate 34 is then positioned into the upper recess 41 of the main body 40 with the driving end SOB of spring wire 50 received in and extending through a compensating slot 36 with mounting holes 38 aligned with threaded holes 44 in upper recess 41. Compensating slot 36 is a cammed slot which is programmed to give a needle indicator 24, which is coupled to driving end SOB in a manner described below, a linear travel when converting the wire 50 straight line motion to needle indicator 24 rotary motion.

A spacer plate 30 is then positioned atop compensating plate 34 with its mounting holes 32 aligned with holes 38 and 44. Meanwhile indicator needle 24 is sub-assembled by being pivotally mounted to the underside of a dial plate 16, having a window 22 therethrough, on a pivot pin 29. Pivot pin 29 is held in an opening 20 through dial plate, and extends into and is held in an opening 28 through indicator needle 24. Then dial plate 16 with needle 24 pivotally mounted thereon is positioned atop spacer plate 30 with the driving end SOB of spring wire 50 received in and extending through a driving slot 26 of needle 24 and with its adjustment slots 18 aligned with holes 32,38, and 44. The above components are then secured to the main body 40 by screws 14 extending through slots 18 and holes 32 and 38 and screwing into threaded holes 44. The assembly is completed by press fitting a lens 12 into upper recess 41 of main body 40 after the calibration process is completed as more fully described below.

c. The Process of Installing the Load Indicator Apparatus in the Fastener Bolt

Figure 19:
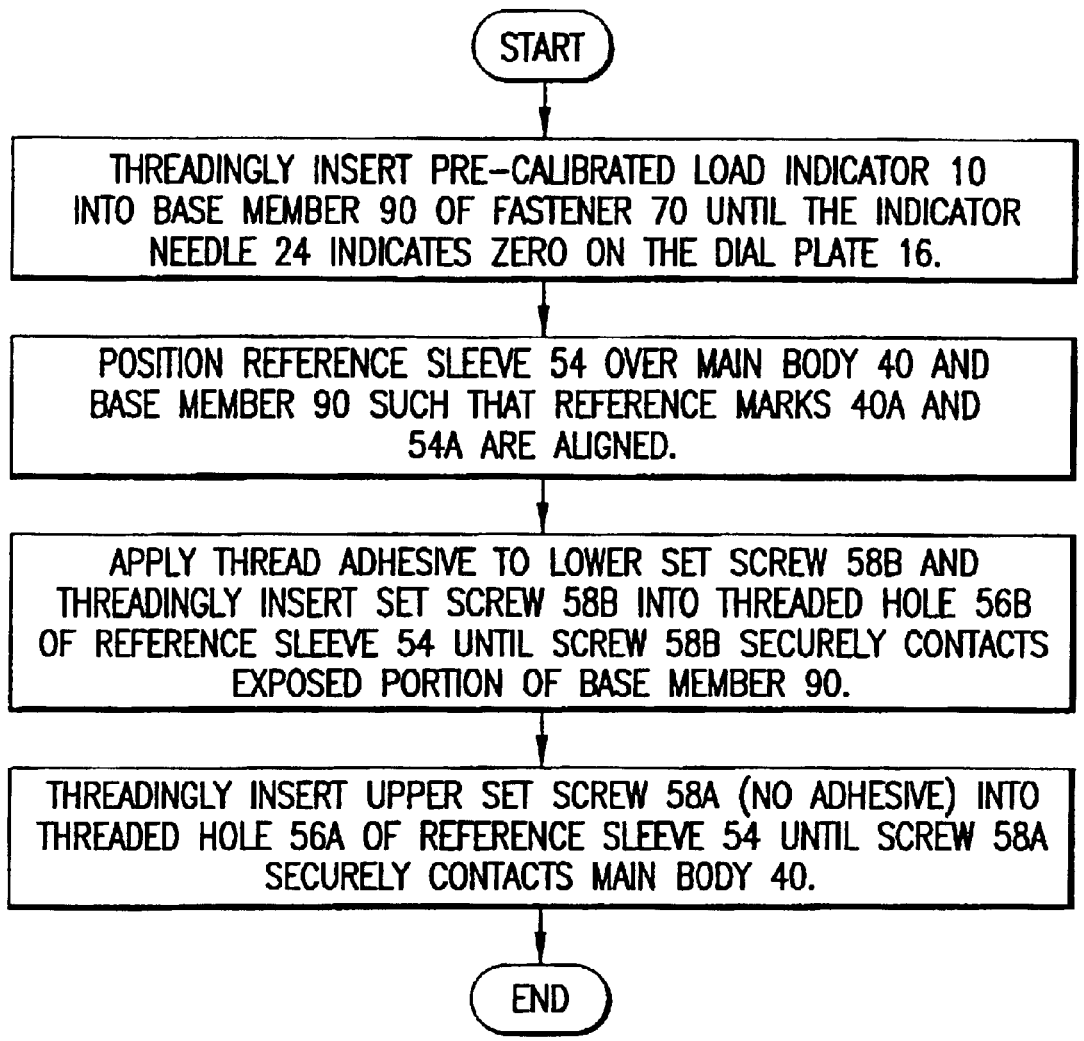
FIG. 19 is a flow chart of the process of installing the load indicator assembly 10 of reference sleeve of the present invention into a fastener of the type described in FIG. 18 to form a fastener assembly of the present invention.
Figure 22:
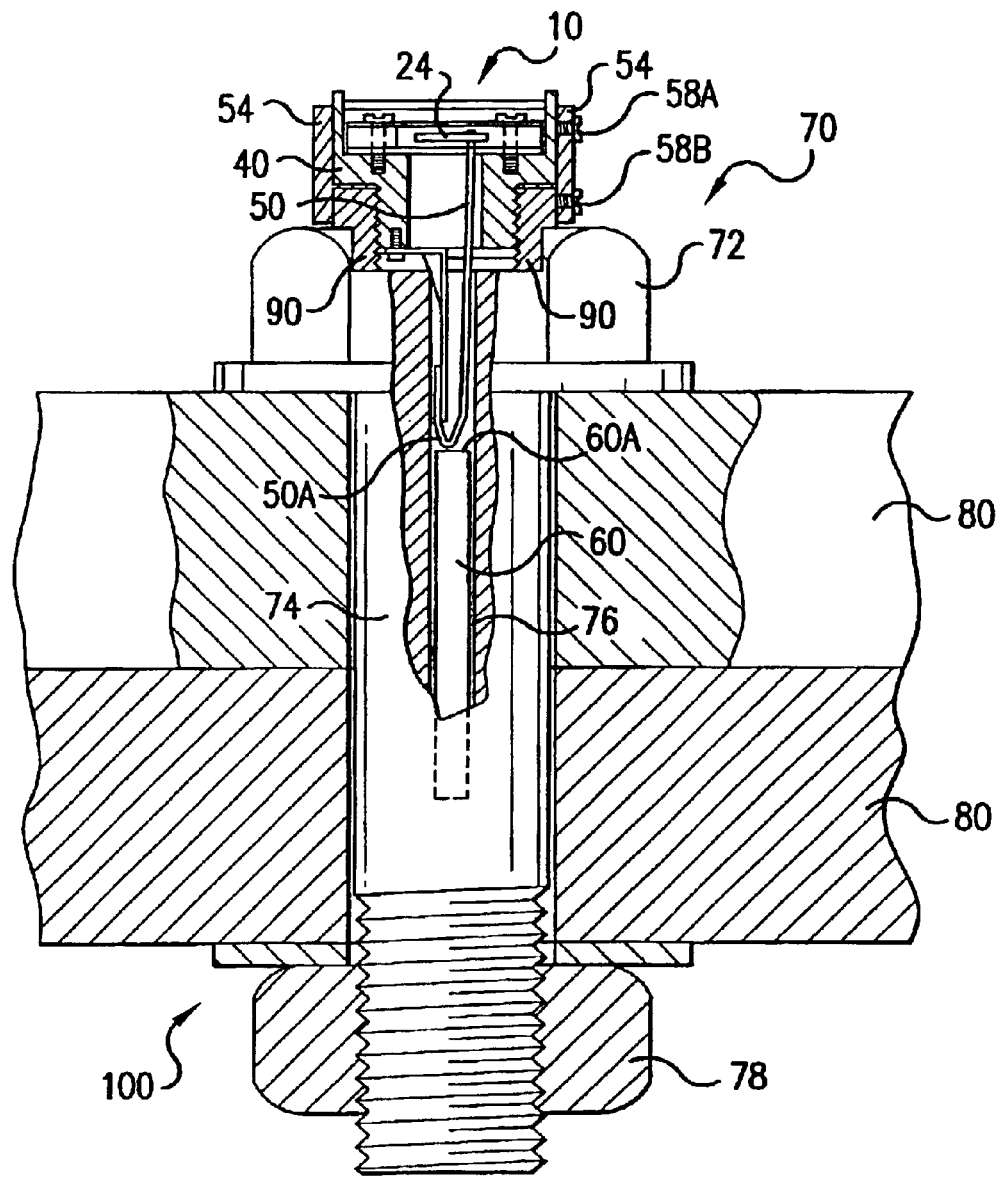
FIG. 22 is a front elevation view in partial section of the mechanical load indicator apparatus of FIGS. 3–17 installed in a fastener including a pre-drilled fastener head 72 and fastener shank 74 of the type seen in FIG. 1 to form a fastener assembly of the present invention.
Figure 23:
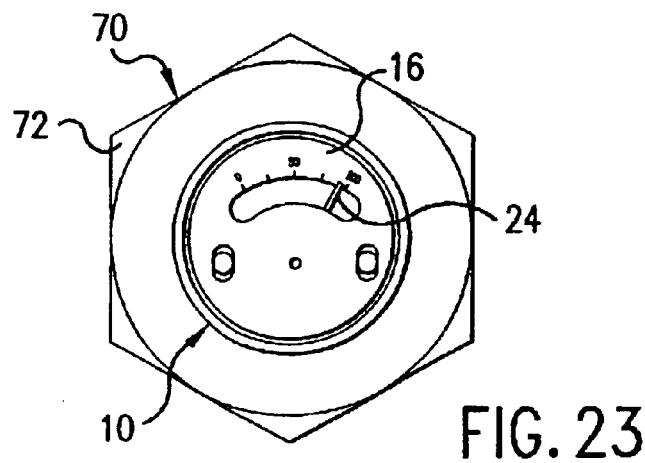
FIG. 23 is a top plan view of FIG. 22.

Referring to FIG. 19, the process of installing the pre-calibrated variable amplification load indicator assembly 10 into a fastener bolt 70 of a fastener 100 includes the following steps:

1. The pre-calibrated load indicator 10 is threaded into base member 90 of fastener bolt 70 until the indicator needle indicates zero on the dial plate 16.
2. Reference sleeve 54 is then placed over main body 40 and base member 90 in a rest position atop fastener head 72. The reference sleeve 54 is then rotated until a sleeve reference mark 54A is aligned with a main body reference mark 40A (FIG. 3) indicating the reference position for zero load on the load indicator dial.
3. The reference sleeve 54 is then locked in this position by applying adhesive to the screw 58B and threading it into threaded hole 56B (FIG. 4) until the screw tightly and securely holds the reference sleeve 54 in contact with the exposed surface portion of base member 90.
4. The load indicator 10 is then locked in its referenced position by threading screw 58A (without adhesive) into threaded hole 56A of reference sleeve 54 until the screw tightly and securely holds the reference sleeve 54 in contact with the exposed surface portion of load indicator 10. A small portion of the top end circumferential wall of the main body 40 extends beyond the top end of reference sleeve 54 when the main body 40 is fully assembled inside of reference sleeve 54. (FIG. 22). This extended lip functions as a gripping surface for a wrench or pliers for installing and removing the load indicator 10.

As more fully described below, the above structure allows the variable amplification load indicator 10 to be removed for routine maintenance and repair and then re-installed in its former position. When the reference mark 40A on the load indicator 10 is aligned with the reference sleeve mark 54A the device can immediately accurately indicate the actual load on the fastener without recalibration.

d. The Process of Removing the Load Indicator From a Load Bearing Fastener

Figure 20:
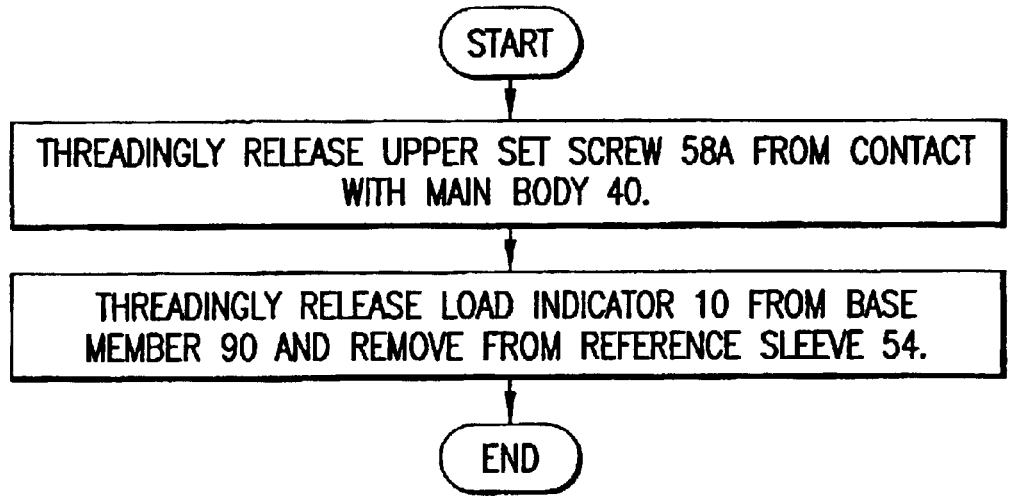
FIG. 20 is a flow chart of the process of removing the load indicator assembly 10 of the present invention from the fastener assembly of the present invention described in FIG. 19.

Referring to FIG. 20, the process of removing the load indicator from a load bearing fastener bolt 100 of a fastener 110 is accomplished by the following steps:

1. Unscrew upper set screw 58A from holding contact with main body 90.
2. Use an insertion/extraction tool to engage gripping slots 40B or other suitable gripping portion located at or near the end portion of the main body 40 proximate to the top of sleeve 54.

Unscrew the load indicator 10 from the base member 90 and remove it from reference sleeve 54.

e. The Process of Re-installing the Load Indicator into a Load Bearing Fastener

Figure 21:
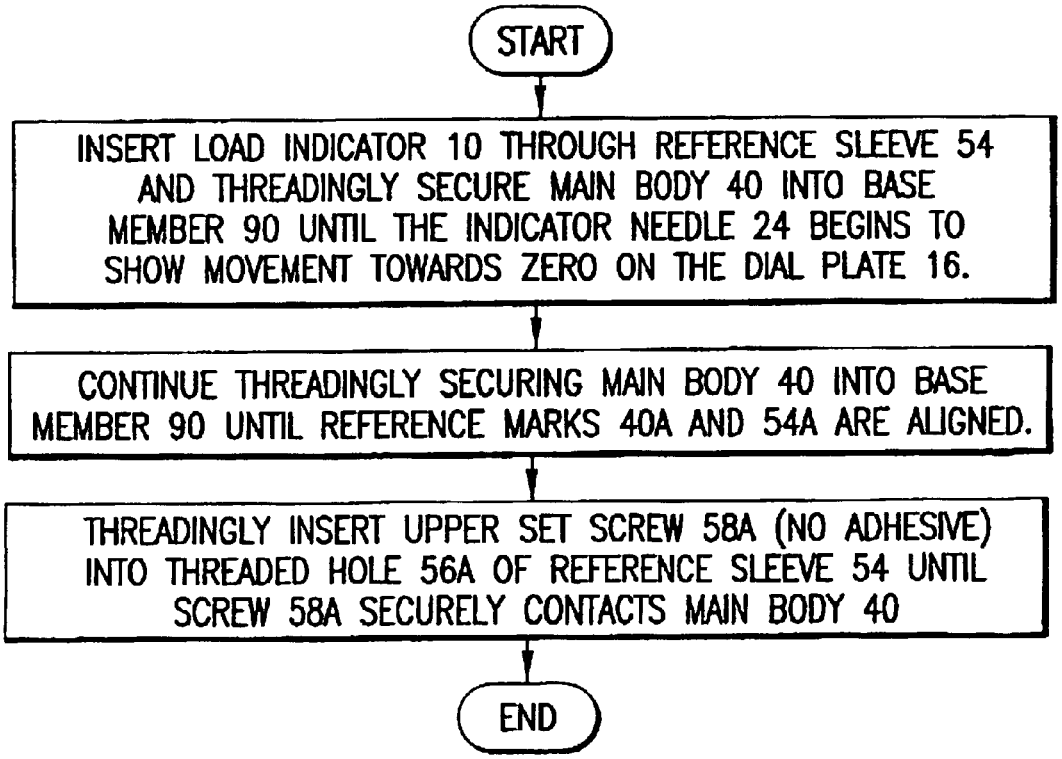
FIG. 21 is a flow chart of the process of re-installing the load indicator assembly 10 of the present invention into the fastener assembly of the present invention described in FIG. 19.

Referring to FIG. 21, the process of re-installing the load indicator 10 into a load bearing fastener bolt 70 of a fastener 100 is accomplished by the following steps:

1. Insert load indicator 10 through the reference sleeve 54 and threadingly secure main body 40 into the base member 90 until the load indicator needle 24 begins to show movement towards zero on the dial plate 16. This movement indicates the spring wire pivot point 50A (FIG. 3) has contacted the top 60A of gauge pin 60.
2. Continue threadingly securing main body 40 into base member 90 until main body reference mark 40A is aligned with sleeve reference mark 54A indicating the main body is aligned with the position of zero % load from whence it started. The main body will correctly and accurately indicate the load that is on the fastener 110.
3. Screw upper set screw 58A into holding contact with main body 90 to lock the main body in position.

f. The Process of Calibrating the Variable Amplification Load Indicator

Figure 24A:
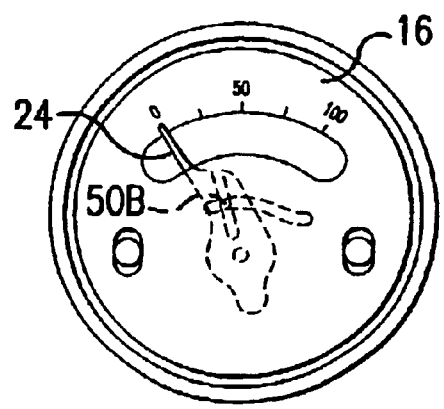
FIG. 24A is a top plan view of FIG. 24.
Figure 24:
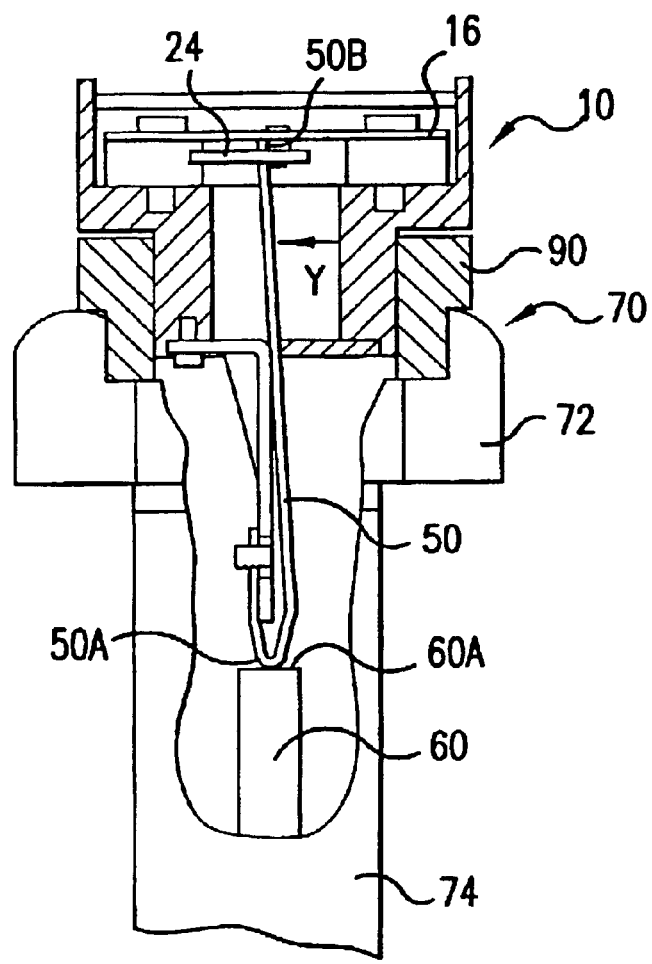
FIG. 24 is a view similar to FIG. 22 showing a 0% load applied to the fastener of the present invention.

As seen in FIGS. 22–26A, and 28–30, and as described in FIG. 27, the process of calibrating the variable amplification load indicator will now be described. FIGS. 24–26A show a series of cross-sections of the variable amplification load indicator of the present invention showing the range of wire movement for 0 to 100% rotation of the needle. In FIGS. 24 and 24A the wire position when the load indicator is inserted into the fastener is "zeroed-out" indicating no load. Note that in this position, spring wire pivot point 50A is pushed upwardly by the raised position of the gauge pin 60 forcing the spring wire indicator driving end 50B to deflect to the left.

Figure 25A:
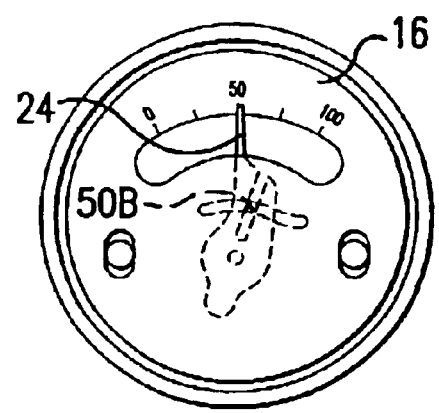
FIG. 25A is a top plan view of FIG. 25.
Figure 25:
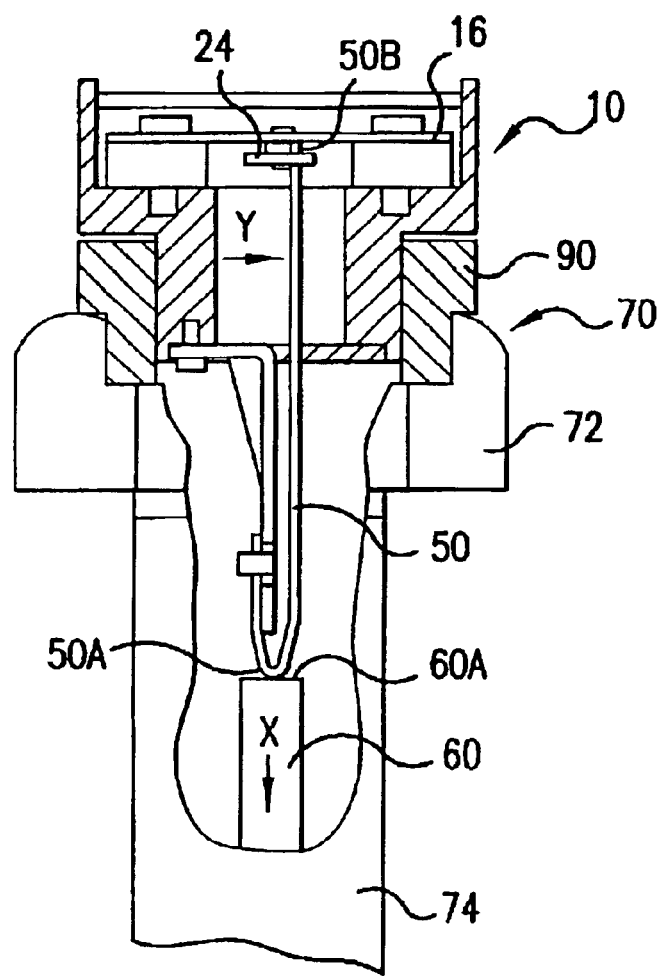
FIG. 25 is a view similar to FIG. 22 showing a 50% load applied to the fastener of the present invention.

In FIGS. 25 and 25A the wire position when the load indicator is inserted into the fastener indicates 50% load. Note that in this position, spring wire pivot point 50A experiences less upward push by the now partially extended (lowered) position of the gauge pin 60 forcing the spring wire indicator driving end 50B to deflect to the right of its no load position.

Figure 26A:
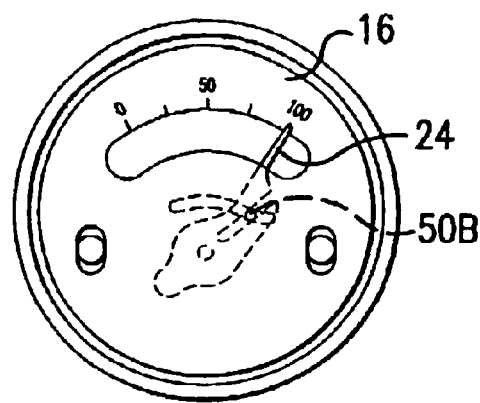
FIG. 26A is a top plan view of FIG. 26.
Figure 26:
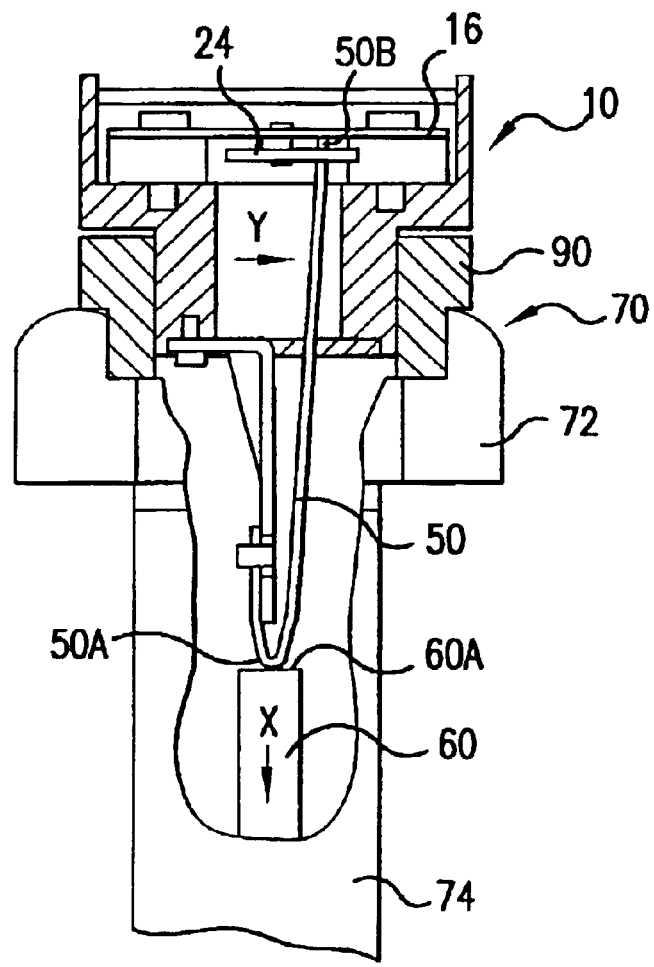
FIG. 26 is a view similar to FIG. 22 showing a 100% load applied to the fastener of the present invention.

In FIGS. 26 and 26A the wire position when the load indicator is inserted into the fastener indicates 100% load. Note that in this position, spring wire pivot point 50A experiences much less upward push by the now fully extended (lowered) position of the gauge pin 60 allowing the spring wire indicator driving end 50B to deflect to its extreme right position relative to its no load position. Thus, elongation of the fastener results in the relaxing of the wire and the driving of the needle through its captured position in compensating slot 36 and indicator needle driving slot 26 to indicate a percentage of maximum load.

The variable amplification load indicator of the present invention is designed so that a predetermined elongation of the fastener drives the wire a predetermined distance thereby also rotating the needle through a predetermined angle. In the preferred embodiment, 0.004" fastener bolt elongation causes 0.125" wire drive end movement.

Figure 28:
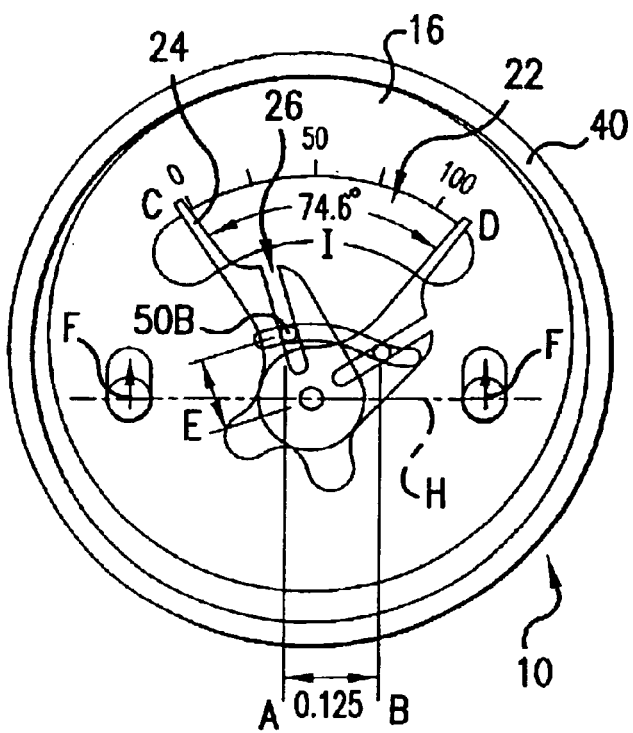
FIG. 28 is a top plan view similar to FIG. 9 showing the dial plate 16 in its fully raised (top) position providing the smallest distance E between the wire drive end 50B and pivot pin 29, the position of maximum amplification of needle 24 movement.
Figure 29:
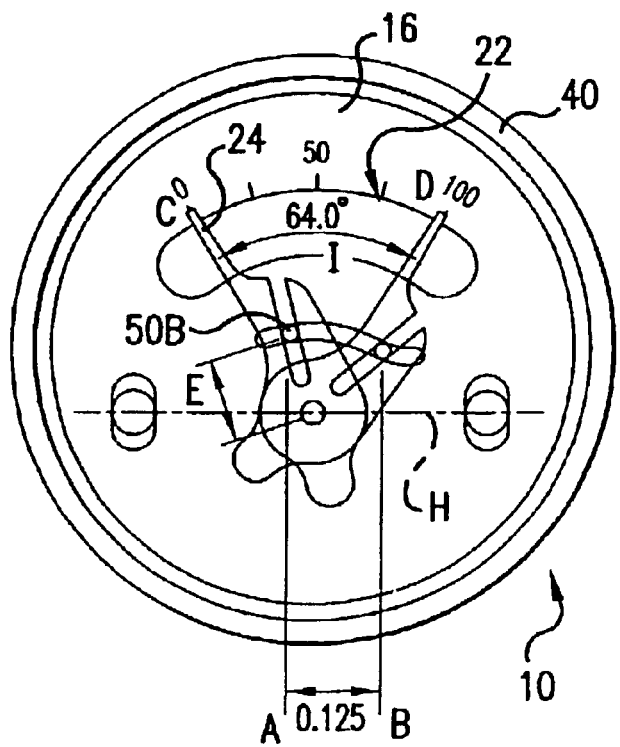
FIG. 29 is a top plan view similar to FIG. 9 showing the dial plate 16 in its middle position providing the median distance E between the wire drive end 50B and pivot pin 29, the position of median amplification of needle 24 movement.
Figures 30, 31:
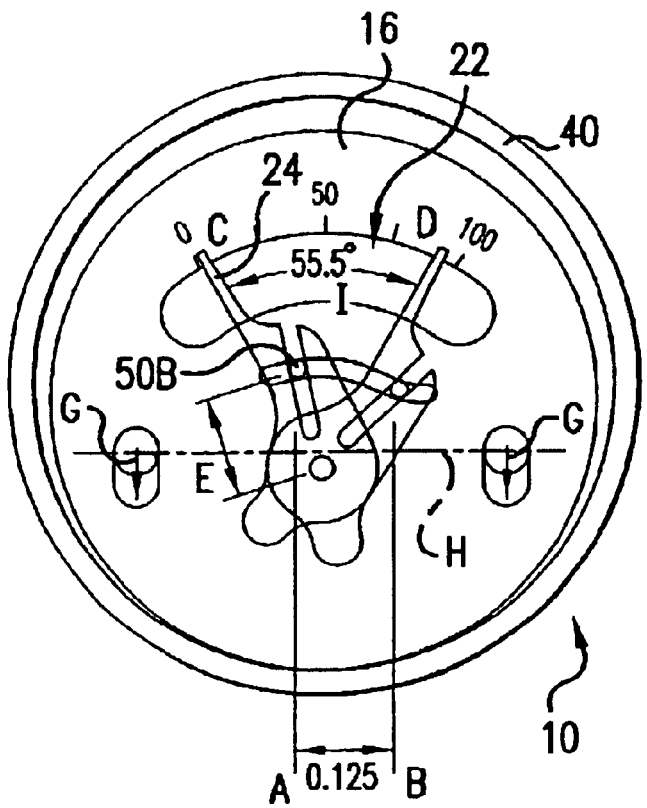
FIG. 30 is a top plan view similar to FIG. 9 showing the dial plate 16 in its lowered (bottom) position providing the maximum distance E between the wire drive end 50B and pivot pin 29, the position of smallest amplification of needle 24 movement.
FIG. 31 is a table showing the angular rotation of the needle in its top, middle and bottom position as shown schematically in FIGS. 28–30.

However, the angular rotation of the needle caused by the spring wire drive end wire movement is adjustable by vertically moving the dial plate 16 to which the needle 24 is pivotally attached. As the dial plate 16 is moved the distance between the needle pivot pin 29 and the drive end 50B changes shortening or lengthening the moment arm E (FIGS. 28–30). The change in the moment arm E causes a corresponding increase or decrease of angular travel of the needle 24. As seen in FIGS. 28–30, the following values are displayed for a 0.004" fastener bolt elongation and a 0.125" wire end movement:

A–B=the distance the wire travels.
C–D=the range of needle position.
E=the distance between the wire and the pivot pin.
F=the distance the face plate is raised.
G=the distance the face plate is lowered.
H=the reference line.
I=the needle span in degrees is 74.6° (raised dial), 64.0° (middle dial), 55.5° (lowered dial).

Figure 27:
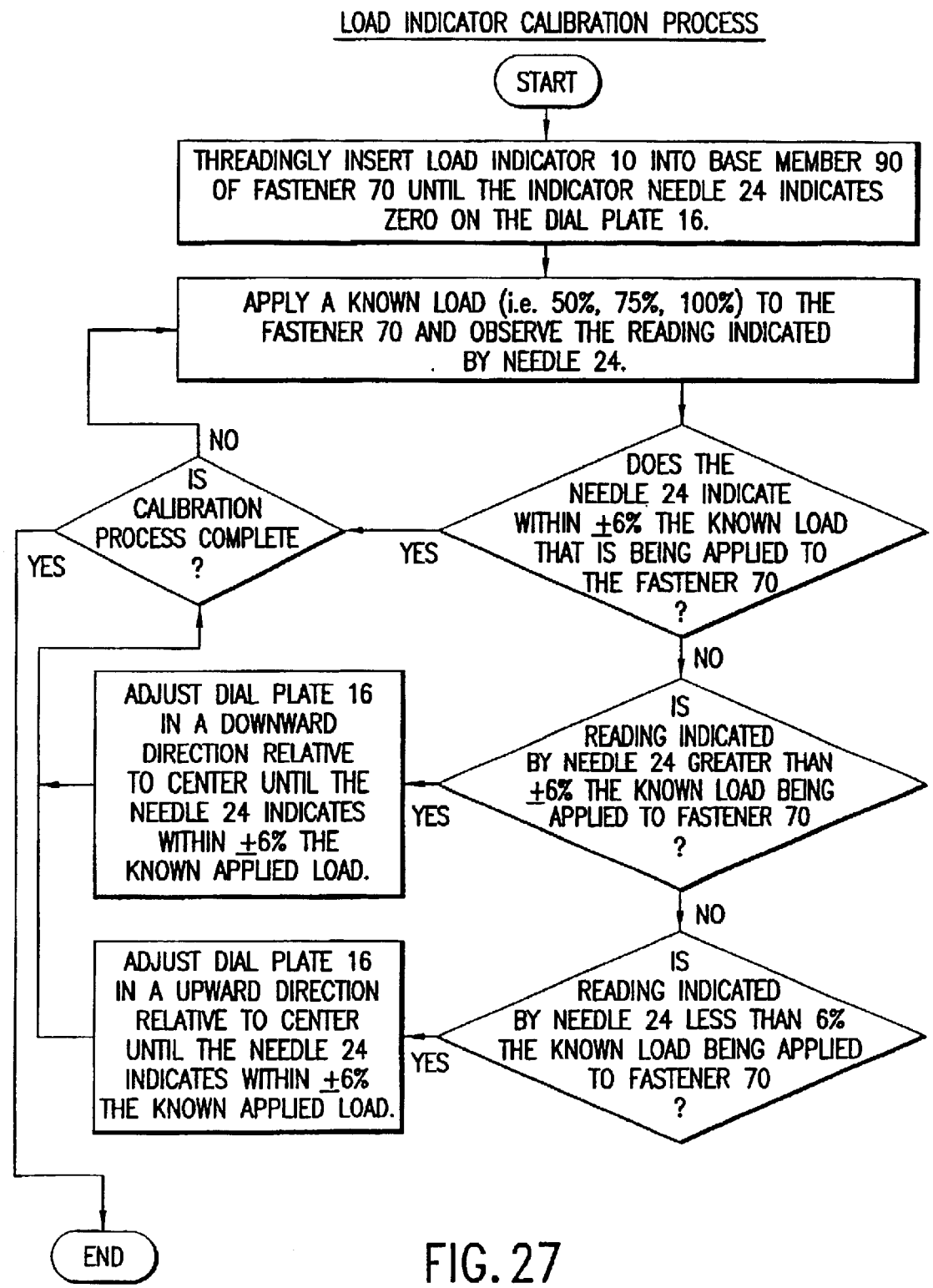
FIG. 27 is a flow chart of the process of calibrating the load indicator assembly 10 of the present invention in a fastener assembly of the present invention.

As described in FIG. 27, the process of calibrating the variable amplification load indicator 10 of the present invention is accomplished by the following steps:

1. Load indicator 10 is threadingly inserted into base member 90 of fastener 110. Spring wire 50 and pivot point 50A are received in bore 76 of fastener bolt 70 to contact gauge pin 60. As the load indicator 10 is threadingly inserted into the base member 90 the spring wire drive end 50B deflects and rotates needle 24 until the needle 24 indicates zero on the dial plate 16.
2. Apply a known load (i.e., 50%, 75%, or 100%) to the fastener bolt 70 and observe the reading indicated by the needle 24.
3. If the needle indicates within ±6% of the known load being applied to the fastener 70, the load indicator is properly calibrated and the process ends.
4. If the needle indicates more than 6% greater than the known load being applied to the fastener 70, apply a correction to reduce the needle travel by lowering the dial plate 16 thereby lengthening the moment arm E and the process ends.
5. If the needle indicates more than 6% less than the known load being applied to the fastener 70, apply a correction to increase the needle travel by raising the dial plate 16 shortening the moment arm E and the process ends.

This new calibration adjustment feature of the present invention is required to compensate for uncontrollable variations inherent in the manufacture of the indicator components.

g. Operation of the Spring Needle to Indicate Actual Load Applied to the Fastener Bolt The spring wire 50, gauge pin 60, and needle 24 cooperate to indicate applied load as follows:

The principle described above in which the spring wire drive end 50B drives the needle 24 in the drive slot 26 resulting in angular rotation of the needle 24 and an amplification of angular rotation at the end of needle 24, represents a significant improvement over the prior art. This amplification of lateral motion enables a smaller hole to be drilled in the fastener head which allows the load indicator assembly 10 to be applied to smaller size fasteners.

Spring wire 50 responds to loads up to the proof load applied to the shank 74 when the fastener is in use. For this to be achieved the spring wire 50 is set in the bore 76 such that the pivot point 50A bears on the top of gauge pin 60. The drive end 50B is under a compressive load which, in the unloaded condition of the fastener, causes that spring wire attachment end to bow. The bowing of the spring wire causes the spring wire drive end 50B to deflect towards the attachment end by a distance corresponding to the extension of the shank under the proof load all according to Young's Modulus.

At no load then with the bowing of the attachment end 50C and the deflecting of the drive end 50B toward the attachment end 50C, the spring wire drive end 50B starts out at the zero end of the scale. As load is applied to the fastener bolt 70 in use and the shank extends under the load, the force of the gauge pin against the spring wire pivot point 50A is gradually reduced. Thus the attachment end 50C progressively returns towards its normal straight form and the drive end 50B moves away from the attachment end 50C. When the proof load is reached and the bearing force of the gauge pin is zero. At this point the attachment end 50C end has fully straightened, the drive end 50B has moved its full extent away from the attachment end limb and the indicator is at or near the opposite end of the compensation slot from which it began. For a more detailed description, the reader is referred to U.S. Pat. No. 5,584,627.

The foregoing description has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated.

I claim:

1. A variably amplified load indicating fastener comprising: a fastener, having a first coefficient of thermal expansion, comprising an abutment which is moved by a chance in length under an applied load; a load indicator, having a second coefficient of thermal expansion, comprising: a plate; a needle pivotally supported by the plate; a first reference mark; a member detachably securing the load indicator to the fastener; a sleeve fitting over the outer circumference of both the load indicator and the member; the sleeve carrying a second reference mark; and an elongated U-shaped element disposed in a direction in which the load is applied thereto when the fastener is in use, wherein a first side of the U is rigidly attached to the fastener, and a closed end of the U is proximate to and moveable by the abutment; wherein the first coefficient of thermal expansion is the same as the second coefficient of thermal expansion.

2. The variably amplified load indicating fastener of claim 1 wherein: the plate is a linearly adjustable dial plate.

3. The variably amplified load indicating fastener of claim 1 further wherein: the member has an outer cylindrical surface; the load indicator has an upper cylindrical part; a first fastener fastens the sleeve to the upper cylindrical part; and a second fastener fastens the sleeve to the outer cylindrical surface.

4. The variably amplified load indicating fastener of claim 1 wherein the fastener comprises: a forged-metal bolt having a head and a shank; and a blind bore extending from a top of the head, through the head and partially through the shank.

5. The variably amplified load indicating fastener of claim 4 wherein: the bolt is made from steel, and the head is hexagonal.

6. The variably amplified load indicating fastener of claim 1 further comprising: the fastener having an axis; a blind bore of predetermined diameter and depth, wherein the blind bore is situated co-axial and internal to the fastener.

7. The variably amplified load indicating fastener of claim 6 further comprising: a clearance gauge pin situated in the blind bore and contacting the load indicator.

8. The variably amplified load indicating fastener of claim 6 wherein: at least a part of the load indicator is located in the blind bore.

9. The variably amplified load indicating fastener according to claim 8: said member comprises a main body having a bottom end and an upper recess, and said load indicator further comprises; a spring wire having first and second legs and a closed end joining said legs, said closed end adapted to contact an abutment in said blind bore; a spring wire support member to which said first leg of said spring wire is secured, with said support member secured to the bottom end of said main body with a driving end of said second leg of said spring wire extending into said recess; a compensating plate, having a compensating slot, disposed in said upper recess with said driving end received in and extending through said compensating slot; a spacer plate disposed atop said compensating plate; the indicator dial disposed atop said spacer plate; the indicator needle having a driving slot pivotally mounted to the underside of a dial plate with said driving end received in and extending through said driving slot, said compensating plate, said spacer plate and said dial plate secured to the main body; and a lens press fit into said upper recess of said main body.

10. The variably amplified load indicating fastener according to claim 9 wherein: said compensating slot is a cammed slot which converts wire linear motion to needle rotary motion and gives the indicator needle a linear travel when converting the wire linear motion to needle rotary motion.

11. The variably amplified load indicating fastener of claim 1 further comprising: a blind bore with an enlarged recessed opening at an end thereof; the member is located in the enlarged recessed opening.

12. The variably amplified load indicating fastener of claim 1 wherein: the load indicator further comprises; a compensating slot; a driving slot; wherein a second side of the U extends through the compensating slot and the driving slot; the needle is operatively coupled to an outer end of said second side; and a dial.

13. The variably amplified load indicating fastener of claim 12 further comprising: a clearance gauge pin situated between the abutment and the load indicator and contacting the closed end of the U.

14. The variably amplified load indicating fastener according to claim 12 wherein: the abutment is formed by an end of a blind bore internal to and coaxial with the fastener.

15. The variably amplified load indicating fastener according to claim 12 wherein: the sides of the U are resiliently movable relative to each other about the closed end of the U in response to a movement of the abutment.

16. The variably amplified load indicating fastener according to claim 12 wherein: the U is made of wire.

17. A load indicator comprising: a main body having a bottom end and an upper recess; a spring wire having first and second legs and a closed end joining said legs body; a driving end of said second leg of said spring wire extending into said recess; a spring wire support member to which said first leg of said spring wire is secured; said support member secured to the bottom end of said main body; a compensating plate, having a compensating slot, disposed in said upper recess; said driving end received in and extending through said compensating slot; a spacer plate disposed atop said compensating plate; a dial plate disposed atop said spacer plate; an indicator needle having a driving slot pivotally mounted to the underside of a dial plate; said driving end received in and extending through said driving slot and operatively coupled to said needle; said compensating plate, said spacer plate and said dial plate secured to the main body; and a lens press fit into said upper recess of said main body.

18. The load indicator according to claim 17 wherein: said compensating slot is a cammed slot which converts wire linear motion to needle rotary motion and is programmed to give the needle indicator a linear travel when converting the wire linear motion to needle rotary motion.

* * * * *